(12) United States Patent
Ritter et al.

(10) Patent No.: US 7,040,274 B1
(45) Date of Patent: May 9, 2006

(54) PROCESS FOR ATTACHING THE OIL SUMP TO AN ENGINE BLOCK OF A COMBUSTION ENGINE

(75) Inventors: Karl-Heinz Ritter, Munich (DE); Thomas M. Schmatz, Munich (DE)

(73) Assignee: Henkel Loctite Deutschland GmbH, Munich (DE)

( * ) Notice: Subject to any disclaimer, the term of this patent is extended or adjusted under 35 U.S.C. 154(b) by 0 days.

(21) Appl. No.: 10/069,879

(22) PCT Filed: Jan. 25, 2000

(86) PCT No.: PCT/EP00/00536

§ 371 (c)(1),
(2), (4) Date: Jul. 25, 2002

(87) PCT Pub. No.: WO00/43644

PCT Pub. Date: Jul. 27, 2000

(30) Foreign Application Priority Data

Jan. 25, 1999 (DE) ................................ 199 02 817

(51) Int. Cl.
*F02F 7/00* (2006.01)

(52) U.S. Cl. ............................... 123/195 C; 29/888.01

(58) Field of Classification Search ............ 123/195 C, 123/273
See application file for complete search history.

(56) References Cited

U.S. PATENT DOCUMENTS

| | | | |
|---|---|---|---|
| 3,671,562 A | 6/1972 | Pepe et al. ............ 260/448.8 R |
| 4,492,217 A * | 1/1985 | Scheidler .................. 126/39 B |
| 4,506,058 A | 3/1985 | Ashby et al. ................ 524/730 |
| 4,784,396 A * | 11/1988 | Scott et al. .................. 277/598 |
| 6,132,664 A * | 10/2000 | Freiberg et al. ............. 264/261 |

FOREIGN PATENT DOCUMENTS

| | | | |
|---|---|---|---|
| DE | 41 03 685 | | 8/1992 |
| DE | 44 39 186 | | 5/1996 |
| DE | 298 12 978 U1 | | 11/1998 |
| EP | 0234636 | * | 9/1987 |
| EP | 0 409 079 | | 1/1991 |
| EP | 0 558 033 | | 9/1993 |
| GB | 2127911 | * | 4/1984 |
| JP | 58 152151 | | 9/1983 |
| WO | WO 92/07896 | | 5/1992 |
| WO | WO 97/17535 | | 5/1997 |

\* cited by examiner

*Primary Examiner*—Tony M. Argenbright
*Assistant Examiner*—Katrina Harris
(74) *Attorney, Agent, or Firm*—Steven C. Bauman

(57) ABSTRACT

For attaching the oil sump (10) to the engine block (30) of a combustion engine, a seal is made between the engine block (30) and the oil sump (10) by means of a curable composition (20). The adhesion of the composition (20) when cured is sufficient to secure the oil sump (10) to the engine block (30). The adhesion should be at least 0.5 N/mm$^2$, especially more than 0.8 N/mm$^2$. The curable composition (20) can be a silicone composition. The oil sump (10) can be fixed to the engine block (30) at least during the curing of the composition (20). To this end, the edge of the oil sump can be designed such that a self-fixing takes place when the oil sump (10) is joined to the engine block (30).

15 Claims, 2 Drawing Sheets

PROCESS FOR ATTACHING THE OIL SUMP TO AN ENGINE BLOCK OF A COMBUSTION ENGINE

Figure 1:
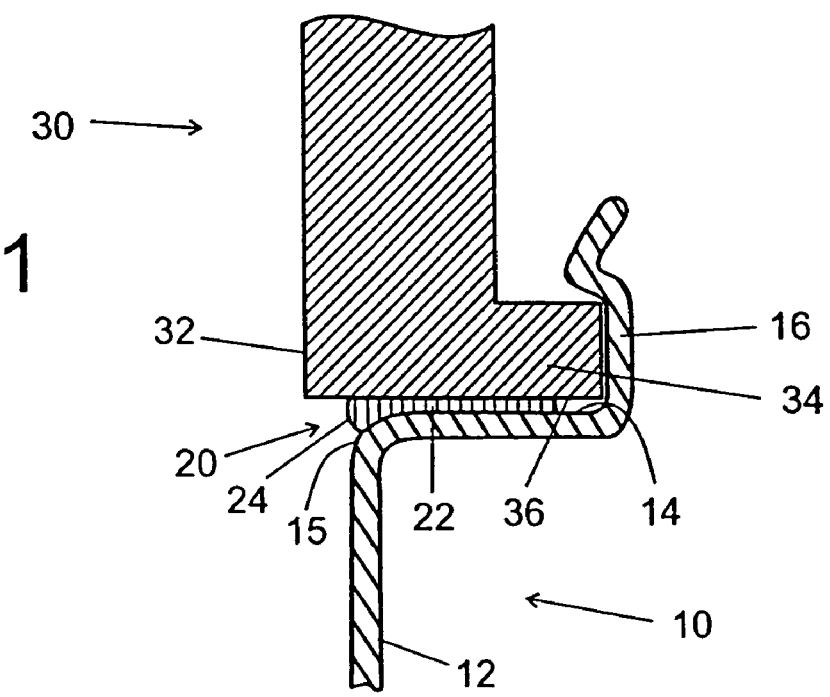

The invention relates to a process for attaching the oil sump to an engine block of a combustion engine, a seal being made between engine block and oil sump by means of a curable composition, as well as a combustion engine with which the oil sump is attached to the engine block in accordance with that process, and in general flange connections which are made in accordance with that process.

There is known from EP-A-0 284 027 an anaerobically vulcanized sealing composition, as well as its use on parts of hydraulically controlled mechanisms and combustion engines, such as the connection between a flange part to an oil sump and an engine block, a connection between cylinder head and cylinder head cover and a connection at the gear box. As in particular the mention as seal of the connection between cylinder head and cylinder head cover shows, screws are hear additionally used as fastening elements.

A method of making polysiloxane sealings is known from EP-A-0 409 079, making a seal to the flange of a motor vehicle oil sump being quoted as an application example. Openings for the fastening bolts are provided for in the flange of the oil sump in the respective drawing so that the fastening bolts are here, too, apparently used as connecting elements.

In a process known from DE-U-298 12 978, the oil sump is also secured to the engine block in the conventional manner by screws. To this end, the engine block must be provided with a number of threaded holes and a corresponding number of screws must then be screwed in.

The object of the invention is to save on these processes and components.

This object is achieved in accordance with the invention by a curable composition being used whose adhesion when cured is sufficient to secure the oil sump to the engine block.

It has shown that the adhesion of curable compositions or adhesives is sufficient to secure an oil sump permanently and securely to an engine block. Preferably an adhesive with an adhesion of at least 0.5 N/mm$^2$, especially of more than 0.8 N/mm$^2$, is used.

With the securing of the oil sump to the engine block in accordance with the invention, the threaded holes in the engine block are unnecessary and there is no screwing-in of the securing screws. The oil sump can easily be stamped from steel sheet. A machining, e.g. a surface grinding or milling, of the sealing surfaces at the engine block and at the oil sump is not necessary as the curable composition can equalize unevennesses up to 0.5 mm or even 1 mm. The maximum allowable unevenness is limited by the fact that, with larger gaps between the engine block and the oil sump, there is the danger that the curable composition will be blown out in the generally customary leak test by displacement with air (blow-out test) on the finally assembled engine. Some 30 minutes are needed to assemble the engine, and the composition cannot cure sufficiently within this time span to resist the overpressure of about 0.5 bar applied in the leak test with thicker layer thicknesses especially if the curing time depends on the thickness of the layer as in the case of silicone adhesives which cure by humidity.

As there are no securing screws for the oil sump, there is a reduction in costs as a result of a decrease in the number of components, a reduction in the assembly time and a simplification of the manufacture of the engine block due to the absence of the threaded holes. Further, cost advantages result from the fact that the oil sump can be a stamped part.

The curable composition can be any adhesive which is suitble for the materials and which possesses a sufficient adhesion for the materials from which the engine block and the oil sump are made, that is metal, especially grey cast iron, aluminum-magnesium alloys and—for the oil sump— plastic. Obviously, the composition must be sufficiently resistant to the media used (oil, water/glycol, antifreeze). FIP (formed in place) products are particularly suited. A suitable curable composition is especially LOCTITE® RTV Silikon 5900 (RTV=room temperature vulcanization).

As such compositions have curing times of up to some days, it is generally necessary to attach the oil sump to the engine block during this time by a self-fixing connection. Clamps and snap connections are suitable for this. The edge of the oil sump can, for example, snap onto a flange of the engine block, or individual holding grips which are bent round the flange of the engine block can be provided at that edge. The edge of the oil sump can also be crimped or curled round the flange on the engine block. As these fixing means are only necessary until the curable composition has cured, they can be removed afterwards if need be and used again.

The sealing surfaces on the engine block and on the oil sump are preferably formed such that there is an uneven layer thickness over the width of the sealing surfaces. To this end, the edge of one or both of the sealing surfaces can have a chamfer with a angle of, e.g., 30° and a width of about 2 mm or be rounded off with a radius of about 4.5 mm, the gap formed being partially or completely filled with the curable composition. The curable composition is applied in known manner. The volume of the gap is to be larger than the amount of curable composition applied so that none of the curable composition is pressed out at the edges. The maximum size of the gap is to be chosen such that the wetting or adhesion of the freshly-applied composition is sufficient to retain the composition in the gap. The curable composition does not need to be applied or distributed over the whole width of the sealing surfaces. A gap free application in the form of a bead is sufficient. With corresponding flange geometry, the application can, e.g., also be at the edge surface of the flange of the engine block, i.e. on a surface which lies parallel to the direction of the assembly comprised of the oil sump and engine block.

The process according to the invention is especially suitable for cases in which the oil sump need not contribute to the overall rigidity of the engine or other machine.

The advantages of the invention have a particularly clear effect when attaching an oil sump to the engine block. The invention can, however, on principle be used when making flange connections with which threaded bolts were hitherto used as connecting elements. The process according to the invention is also suitable in the same manner, e.g., for the attachment of valve covers and of covers or lids to timing cases or gear boxes.

Figure 2:
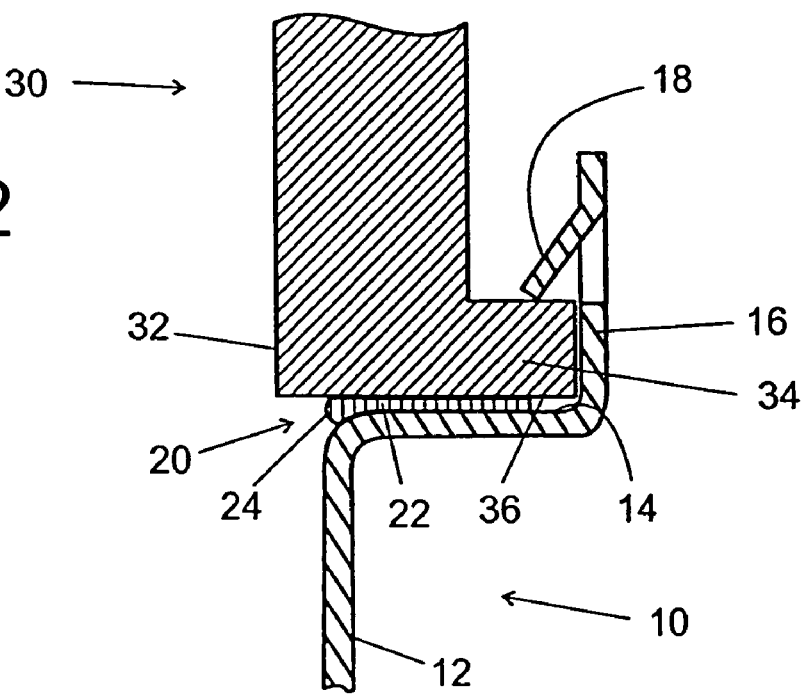
Figure 3:
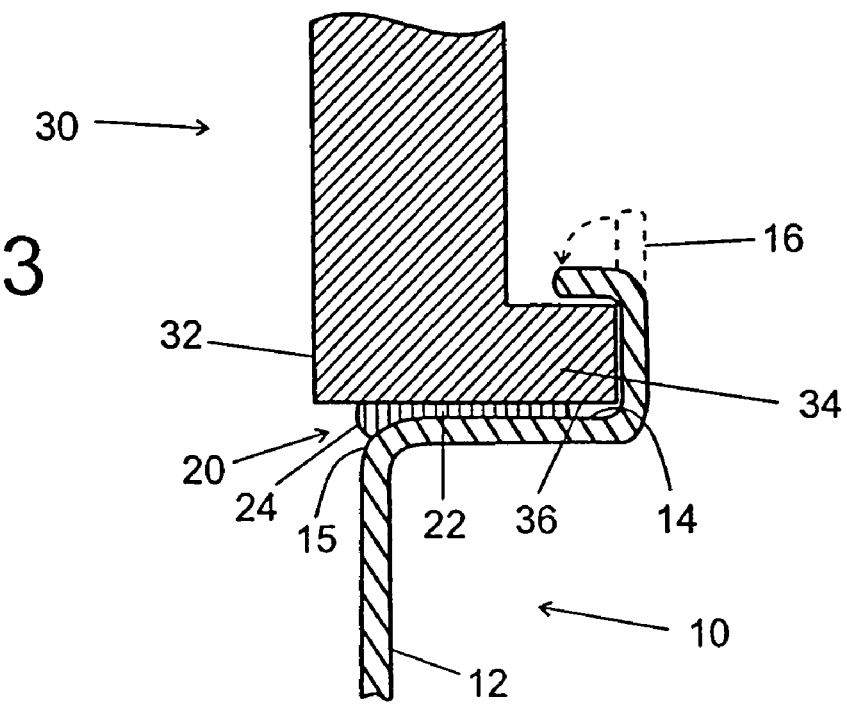
Figure 4:
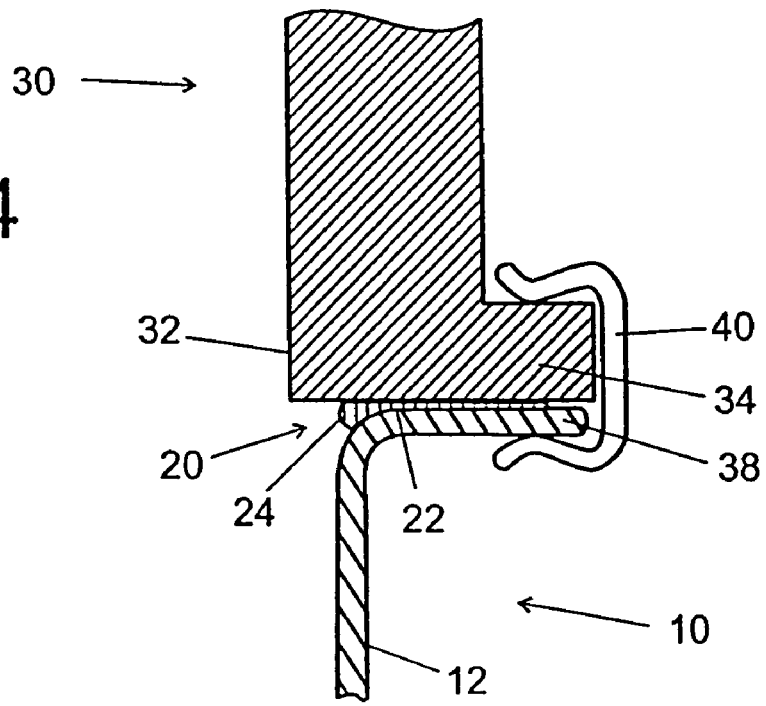

An embodiment example of the invention is explained in more detail in the following with reference to the drawing. There are shown in:

FIG. 1 in section, the edge of the oil sump and of the oil sump opening of the engine block with a first embodiment of the fixing means;

FIGS. 2 to 4 in section, the edge of the oil sump with other embodiments of the fixing means.

FIG. 1 shows an oil sump 10 which is fixed to an engine block 30 by means of a curable composition 20. The edge 12 of the oil sump 10 is bent to produce a substantially flat first sealing surface 14 (bend 15). The engine block 30 has an oil sump opening 32 surrounded by a flange which has a substantially flat second sealing surface 36. There is a layer 22 of the curable composition 20 between the two sealing surfaces 14, 36.

The bend 15 of the edge 12 of the oil sump 10 has a radius of about 4.5 mm so that the distance of the sealing surfaces 14, 36 from the inside of the oil sump 10 diminishes progressively. The thickness of the layer 22 of the curable composition 20 located between the sealing surfaces 14, 36 is, therefore, not uniform but is at its greatest on the inside of the oil sump 10 and decreases outwards.

Bent against the outer edge of the sealing surface 14 of the oil sump 10 is a fixing edge 16 which encompasses the flange 34 of the engine block 30 to the extent that the oil sump is fixed to the engine block 30 during the further assembly of the engine and the motor vehicle. The fixing edge 16 snaps or locks round the flange 34 when the oil sump 10 is pressed against the flange 34.

Later during the running of the motor vehicle, the fixing edge 16 simultaneously forms a safeguard against a detachment of the oil sump 10 from the engine block 30 in the event of an accident or other sudden stress impact.

FIG. 2 shows another possibility for fixing the oil sump 10 to the engine block 30. In a manner similar to that in FIG. 1, a fixing edge 16 is provided but barb-like tongues 18 which rest against the upper side of the flange 34 are pressed out from the fixing edge 16.

FIG. 3 shows a fixing of the oil sump 10 to the engine block 30 in which the fixing edge 16 of the oil sump 10 is reshaped after the application of the curable composition 20 and the joining of the oil sump 10 and the engine block 30 so that it encompasses the flange 34. This reshaping need not extend over the entire edge 16 of the oil sump 10. A pointwise fixing at a distance of, e.g., 20 cm is generally sufficient.

FIG. 4 shows an embodiment in which the edge 16 of the oil sump 10 forms an outwardly directed flange 38. After the application of the curable composition 20 and the joining of the oil sump 10 and the engine block 30, clamps 40 are attached which hold the oil sump 10 against the flange 34 of the engine block 30 during the curing of the composition 20.

EXAMPLE

To join together an oil sump 10 stamped from steel sheet and a cast steel engine block 30, the sealing surfaces 14, 36 are cleaned of loose dirt particles and dried. The sealing surfaces 14, 36 have a covering width of about 9 mm, and a bead about 3 mm in diameter of the curable composition 20—which corresponds to about 10 g/m—is applied to one or both sealing surfaces 14, 36. LOCTITE® RTV-Silikon 5900 is used as curable composition 20. The oil sump 10 is then moved up onto the flange 34 of the engine block 30 so that the fixing edge 16 snaps around the flange 34. The bead of the curable composition 20 is pressed out to give a layer 22 about 0.5 mm thick and a part of the composition 20 is pressed inwards to the bend 15 of the edge 12 where the composition 20 forms a meniscus 24 between the oil sump 10 and the flange 34 of the engine block 30. Because of the high viscosity of the curable composition 20, the meniscus 24 is convex.

LIST OF REFERENCE NUMERALS 10 oil sump
12 edge
14 sealing surface
15 bend
16 fixing edge
18 tongues
20 composition
22 layer
24 meniscus
30 engine block
32 oil sump opening
34 flange
36 sealing surface
38 flange
40 clamp

What is claimed is:

1. A process for attaching an oil sump to an engine block of a combustion engine, a seal being made by a curable composition between a first sealing surface on the oil sump and a second sealing surface on the engine block, to which the curable composition is applied to one or both sealing surfaces, wherein when cured the curable composition demonstrates adhesion sufficient to secure the oil sump to the engine block, threaded bolts are not used as fastening elements and the oil sump is fixed to the engine block at least during the curing of the curable composition, wherein the curable composition demonstrates adhesion of at least 0.5 N/mm$^2$.

2. A process for attaching an oil sump to an engine block of a combustion engine, a seal being made by a curable composition between a first sealing surface on the oil sump and a second sealing surface on the engine block, to which the curable composition is applied to one or both sealing surfaces, wherein when cured the curable composition demonstrates adhesion sufficient to secure the oil sump to the engine block, threaded bolts are not used as fastening elements and the oil sump is fixed to the engine block at least during the curing of the curable composition, wherein the oil sump is stamped from a material selected from the group consisting of steel sheet and plastics material and an engine block constructed from a material selected from the group consisting of cast aluminum and grey cast iron.

3. A process for attaching an oil sump to an engine block of a combustion engine, a seal being made by a curable composition between a first sealing surface on the oil sump and a second sealing surface on the engine block, to which the curable composition is applied to one or both sealing surfaces, wherein when cured the curable composition demonstrates adhesion sufficient to secure the oil sump to the engine block, threaded bolts are not used as fastening elements and the oil sump is fixed to the engine block at least during the curing of the curable composition, wherein the oil sump has an edge which is designed such that self-fixing takes place when the oil sump is joined to the engine block.

4. The process according to claim 3, wherein the oil sump has a fixing edge and the engine block has a flange such that the fixing of the oil sump takes place by the snapping of the fixing edge onto the flange.

5. A process for attaching an oil sump to an engine block of a combustion engine, a seal being made by a curable composition between a first sealing surface on the oil sump and a second sealing surface on the engine block, to which the curable composition is applied to one or both sealing surfaces, wherein when cured the curable composition demonstrates adhesion sufficient to secure the oil sump to the engine block, threaded bolts are not used as fastening elements and the oil sump is fixed to the engine block at least during the curing of the curable composition, wherein barb-like tongues which rest against a flange on the engine block are formed at the edge of the oil sump.

6. The process according to claim 3, wherein the edge of the oil sump is designed such that the oil sump is fixable to the engine block by a reshaping process taking place after joining.

7. A process for attaching an oil sump to an engine block of a combustion engine, a seal being made by a curable composition between a first sealing surface on the oil sump and a second sealing surface on the engine block, to which the curable composition is applied to one or both sealing surfaces, wherein when cured the curable composition demonstrates adhesion sufficient to secure the oil sump to the engine block, threaded bolts are not used as fastening elements and the oil sump is fixed to the engine block at least during the curing of the curable composition, wherein after the oil sump has been joined to the engine block, holding clamps are attached in order to fix the oil sump to the engine block.

8. A process for attaching an oil sump to an engine block of a combustion engine, a seal being made by a curable composition between a first sealing surface on the oil sump and a second sealing surface on the engine block, to which the curable composition is applied to one or both sealing surfaces, wherein when cured the curable composition demonstrates adhesion sufficient to secure the oil sump to the engine block, threaded bolts are not used as fastening elements and the oil sump is fixed to the engine block at least during the curing of the curable composition, wherein seating surfaces are formed on the oil sump and the engine block such that the sealing gap formed therebetween increases in size inwards.

9. A combustion engine comprising an engine block and an oil sump attached thereto, wherein the oil sump is attached to the engine block with a curable composition whose adhesion when cured is sufficient to secure the oil sump to the engine block, wherein the composition when cured demonstrates an adhesion of at least 0.5 N/mm$^2$.

10. A combustion engine comprising an engine block and an oil sump attached thereto, wherein the oil sump is attached to the engine block with a curable composition whose adhesion when cured is sufficient to secure the oil sump to the engine block, wherein the oil sump is stamped from a material selected from the group consisting of sheet steel and plastics and the engine block is constructed from a material selected from the group consisting of cast aluminum and grey cast iron.

11. A combustion engine comprising an engine block and an oil sump attached thereto, wherein the oil sump is attached to the engine block with a curable composition whose adhesion when cured is sufficient to secure the oil sump to the engine block, wherein a self-fixing takes place when the oil sump is joined to the engine block.

12. A combustion engine comprising an engine block and an oil sump attached thereto, wherein the oil sump is attached to the engine block with a curable composition whose adhesion when cured is sufficient to secure the oil sump to the engine block, wherein the oil sump has a fixing edge and the engine block has a flange such that the fixing of the oil sump takes place by the snapping of the fixing edge onto the flange.

13. A combustion engine comprising an engine block and an oil sump attached thereto, wherein the oil sump is attached to the engine block with a curable composition whose adhesion when cured is sufficient to secure the oil sump to the engine block, wherein barb-like tongues which rest against a flange on the engine block are formed at the edge of the oil sump.

14. A combustion engine comprising an engine block and an oil sump attached thereto, wherein the oil sump is attached to the engine block with a curable composition whose adhesion when cured is sufficient to secure the oil sump to the engine block, wherein the oil sump and the engine block have sealing surfaces which are shaped such that the sealing gap formed between them increases in size inwards.

15. A flange connection with two flange elements between which a seal is made from the cured product of a curable silicone composition, wherein threaded bolts are not used as connecting elements for the flange connection and wherein the curable silicone composition demonstrates adhesion of at least 0.5 N/mm$^2$.

\* \* \* \* \*